(12) United States Patent
Linde

(10) Patent No.: US 12,588,598 B2
(45) Date of Patent: Mar. 31, 2026

(54) LIFT SYSTEM FOR BUBBLE UP AUGER OF COMBINE HARVESTER

(71) Applicant: CNH Industrial America LLC, New Holland, PA (US)

(72) Inventor: Karl Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 370 days.

(21) Appl. No.: 18/223,638

(22) Filed: Jul. 19, 2023

(65) Prior Publication Data

US 2025/0024785 A1 Jan. 23, 2025

(51) Int. Cl.
| | |
|---|---|
| *A01F 12/46* | (2006.01) |
| *A01D 41/12* | (2006.01) |
| *A01D 61/00* | (2006.01) |

(52) U.S. Cl.
CPC ....... *A01D 61/004* (2013.01); *A01D 41/1226* (2013.01); *A01F 12/46* (2013.01)

(58) Field of Classification Search
CPC ....... A01D 61/004; A01F 12/46; A01F 12/39; A01F 17/02
See application file for complete search history.

(56) References Cited

U.S. PATENT DOCUMENTS

| | | | | |
|---|---|---|---|---|
| 3,006,226 | A | * 10/1961 | Poysa | ........................ B25B 1/22 |
| | | | | 269/283 |
| 3,550,793 | A | * 12/1970 | Garner | ............... A01D 41/1217 |
| | | | | 198/667 |
| 5,695,398 | A | 12/1997 | Carlson et al. | |
| 6,508,705 | B1 | * 1/2003 | Van Overschelde | ........................ |
| | | | | A01D 41/1226 |
| | | | | 460/119 |
| 7,585,214 | B1 | * 9/2009 | Johnson | ............. A01D 41/1226 |
| | | | | 460/119 |
| 9,775,297 | B2 | 10/2017 | Ricketts et al. | |
| 9,907,228 | B2 | 3/2018 | Vandevelde et al. | |
| 2023/0020643 | A1 | 1/2023 | Duquesne et al. | |
| 2023/0072267 | A1 | 3/2023 | Lensch | |

FOREIGN PATENT DOCUMENTS

| | | |
|---|---|---|
| EP | 1201112 B1 | 9/2005 |
| EP | 4136955 A1 | 2/2023 |

OTHER PUBLICATIONS

The Extended European Search Report issued Dec. 13, 2024, by the European Patent Office in corresponding European Patent Application No. 24189593.7-1105. (6 pages).

* cited by examiner

*Primary Examiner* — Cathleen R Hutchins

(74) *Attorney, Agent, or Firm* — Buchanan Ingersoll & Rooney PC

(57) ABSTRACT

A bubble-up auger assembly for an agricultural vehicle includes an auger at least partially surrounded by an outer tube. A bracket is configured to be non-rotatably connected to a rockershaft of the agricultural vehicle for rotation about a first axis. A slide rod is connected to the outer tube and the bracket. The slide rod is configured to cause the auger to move between a raised position and a lowered position in response to rotation of the bracket. In the lowered position of the auger, an axis of rotation of the auger is oriented oblique to the first axis.

16 Claims, 6 Drawing Sheets

LIFT SYSTEM FOR BUBBLE UP AUGER OF COMBINE HARVESTER

FIELD OF THE INVENTION

The present invention relates to agricultural harvesters. More specifically, the present invention relates to a bubble up auger for a combine harvester, and a system for lifting and supporting the bubble up auger.

BACKGROUND OF THE INVENTION

As is described in U.S. Pat. No. 9,775,297 as well as U.S. Patent App. Pub. Nos. 2023/0072267 and 2023/0020643, which are each incorporated by reference in their entirety and for all purposes, a combine harvester generally includes a header which cuts the crop. The header then moves the cut crop into a feeder house. The feeder house lifts the cut crop into the threshing, separation and cleaning areas of the agricultural combine. The grain is separated from crop stalk by a rotor or threshing system. Grain enters a clean grain elevator typically positioned on one side of the combine. Near the top of the elevator the grain is deposited to a base of a bubble up auger. The purpose of the bubble up auger is to move the grain towards the center of the grain tank. At the end of the bubble up auger the grain is discharged into the grain tank's center.

The bubble up auger is hinged at the base of the auger so that the auger can rotate or pivot between (i) a deployed, or raised position, where the auger can (optionally) extend above the top opening of the grain tank, and (ii) a transport, or lowered position, wherein the auger is positioned entirely within the grain tank. The grain tank includes a cover assembly that is movably (e.g., pivotably) mounted to the top end of the grain tank. The cover assembly is moveable between (i) an open position where the cover panels of the cover assembly expose the interior of the grain tank and (ii) a closed position where the cover panels of the cover assembly enclose the top end of the grain tank in an effort to shield the clean grain within the grain tank from the outside environment. A linkage connects the bubble up auger to the cover assembly such that (i) as the cover assembly moves to the open position, the linkage automatically raises the bubble up auger to the deployed (raised) position; and (ii) as the cover assembly moves to the closed position, the linkage lowers the bubble up auger to the transport (lowered) position such that the bubble up auger is positioned in its entirety within the grain tank interior and concealed by the closed cover assembly.

The bubble up auger has traditionally been oriented perpendicular to a rockershaft of the linkage that rotates the bubble up auger between the deployed and transport positions. However, to accommodate a bubble up auger having a greater length, it would be beneficial to angle the bubble up auger relative to the rockershaft. There exists a need for a lift system that will raise the angled bubble up auger from the transport (storage) position in the grain tank and hold the bubble up auger in the raised position without any additional locking mechanisms or actuators.

SUMMARY OF THE INVENTION

According to one aspect of the invention, a bubble-up auger assembly for an agricultural vehicle includes an auger at least partially surrounded by an outer tube. A bracket is configured to be non-rotatably connected to a rockershaft of the agricultural vehicle for rotation about a first axis. A slide rod is connected to the outer tube and the bracket. The slide rod is configured to cause the auger to move between a raised position and a lowered position in response to rotation of the bracket. In the lowered position of the auger, an axis of rotation of the auger is oriented oblique to the first axis.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
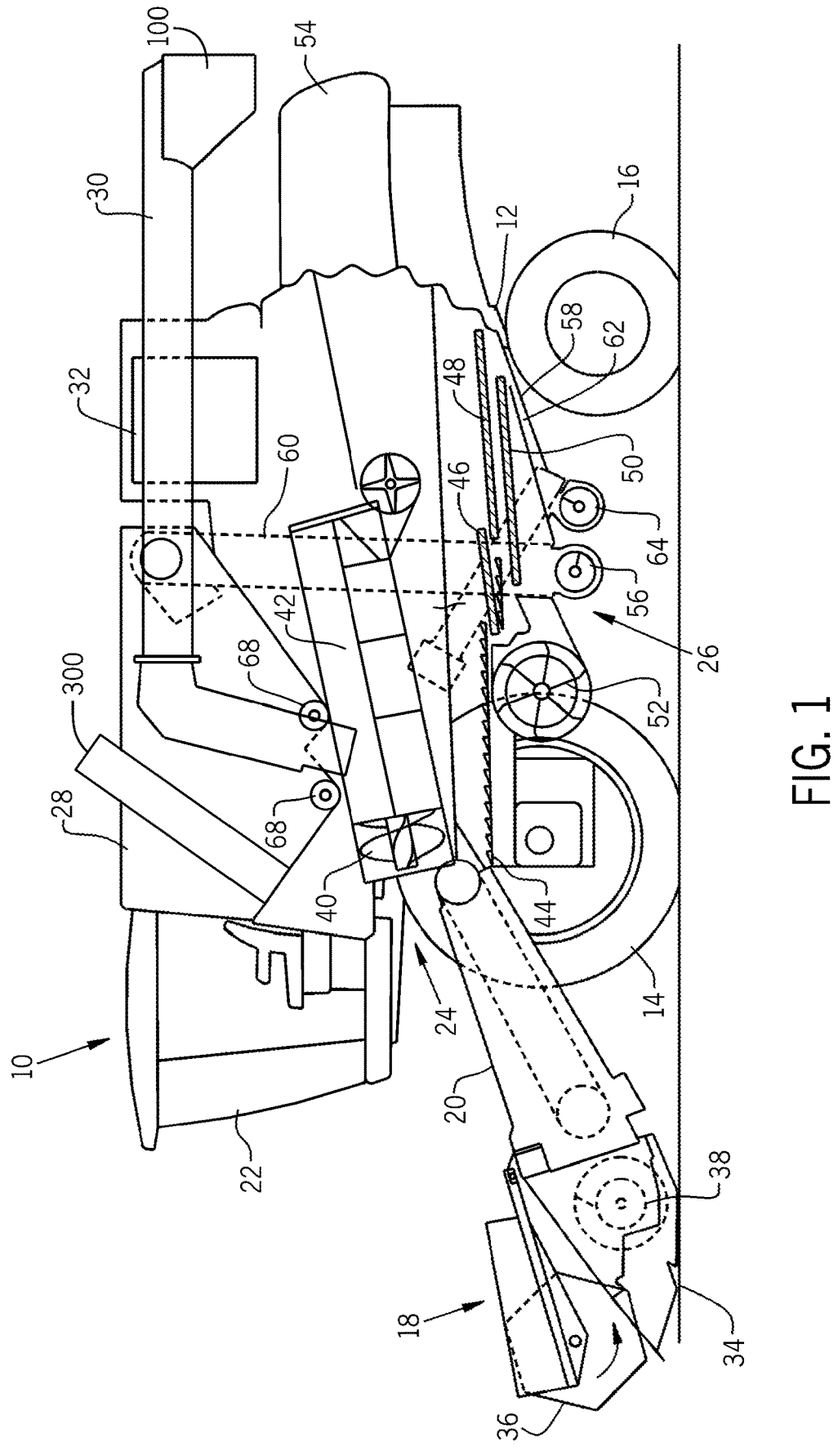
FIG. 1 is a side view of an embodiment of an agricultural harvester in the form of a combine.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

As is described in U.S. Pat. No. 9,907,228, which is incorporated by reference herein in its entirety, FIG. 1 depicts an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyor 30. Unloading conveyor 30 is illustrated as an unloading auger, but can also be configured as a belt conveyor, chain elevator, etc. Motive force is selectively applied to front wheels 14 through a power plant in the form of a diesel engine 32 and a transmission (not shown).

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24. Header 18 can vary and is not limited to that which is shown and described.

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. System 24 can vary and is not limited to that which is shown and described.

Grain which has been separated by the threshing and separating system 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50. System 26 can vary and is not limited to that which is shown and described.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10. The augers and elevators can vary and are not limited to that which is shown and described.

Figure 2:
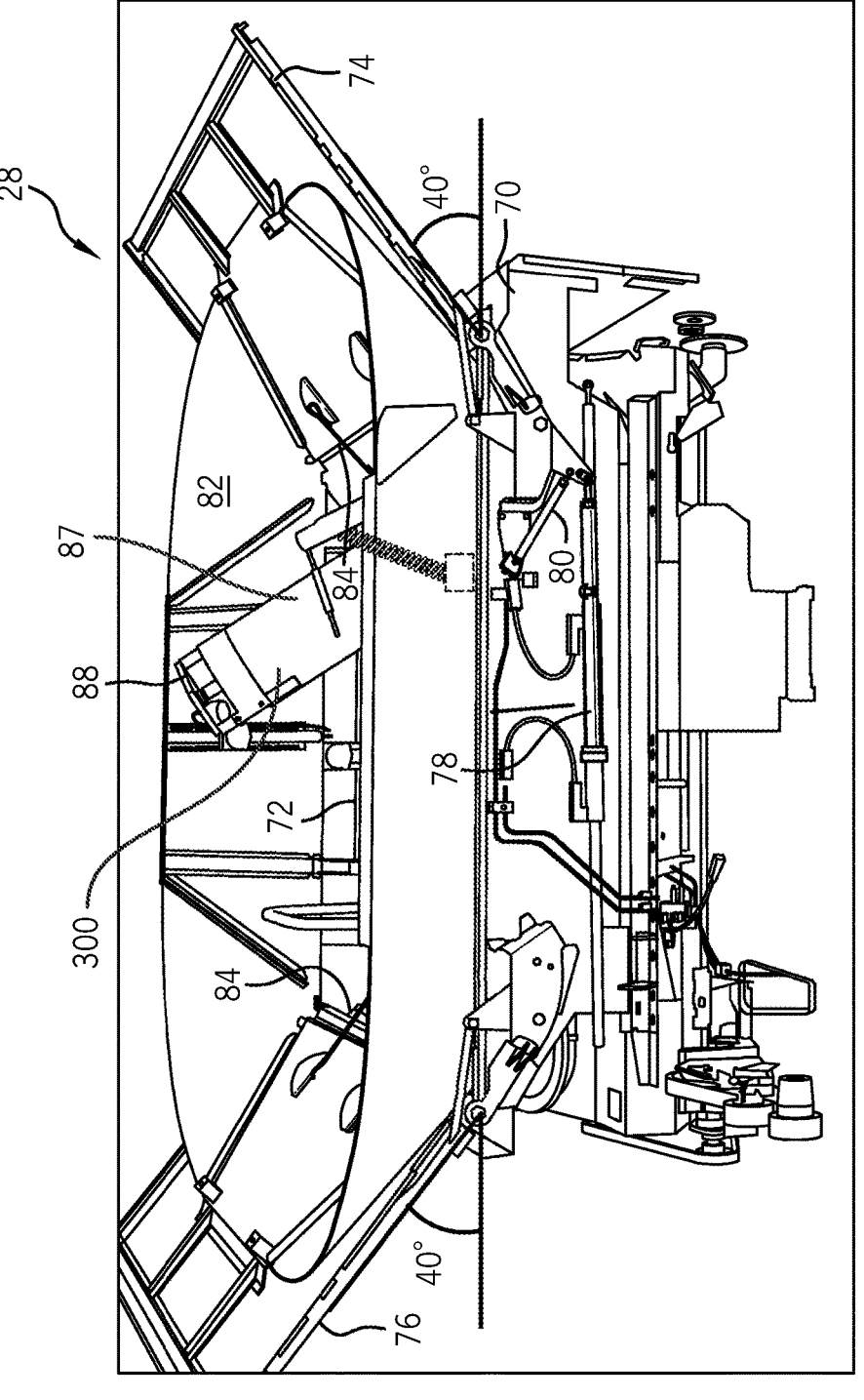
FIG. 2 is a side view of a grain tank of the combine of FIG. 1 with tank cover sections shown in an open position.

FIG. 2 depicts grain tank 28 of combine 10. Grain tank 28 includes frame 70, a pair of tank cover sections 74 and 76 that are movably associated with the frame 70, an actuator 78 linked to the tank cover section 74, and a force assistor 80 linked to the tank cover section 74. The cover sections 74, 76 are connected to the grain tank 28 by a linkage system so that the tank cover sections 74, 76 always move together. It is also noted that grain tank 28 can include additional cover sections.

As can be seen, the frame 70 forms the body of the grain tank 28 and can be expanded by the tank cover sections, as well as an expandable element 82 that is raised and lowered with the tank cover sections. In this sense, the capacity of the grain tank 28 can be increased by raising all of the tank cover sections as well as the expandable element 82, which is shown as four rubber corners moving together with the tank cover section.

The tank cover sections 74 and 76 are movably associated with the frame 70 so that they can switch between an open position (shown in FIG. 2), and a closed or covering position (not shown). In the open position, the opening 72 of grain tank 28 is exposed, whereas, in the closed position, the opening 72 is concealed by the covers 74 and 76. As shown, the tank cover sections 74 and 76 are mounted to the frame 70 so the tank cover sections 74 and 76 can move to an opening angle relative to the opening 72, shown as 40 degrees in FIG. 2. While the tank cover sections 74 and 76 are shown as being hinged to the frame 70, it is contemplated that the tank cover sections 74 and 76 could be movably associated with the frame 70 in other ways, such as by sliding.

A bubble up auger 300 is mounted to tank 28 as well as tank cover section 74 so that as the tank cover section 74 moves, the bubble up auger 300 can be raised and lowered within the grain tank 28 relative to the opening 72. This allows for an output end 88 of the bubble up auger 300 to raise and lower as the capacity of the grain tank 28 changes, which can correspond to increasing and decreasing amounts of grain held within the grain tank 28. This is important for fill distribution and to lower power consumption by preventing the output end 88 from being buried under too much grain or being held too high above the grain level. The details regarding movement of tank cover sections 74 and 76 may vary from that which are shown and described herein.

Figure 3:
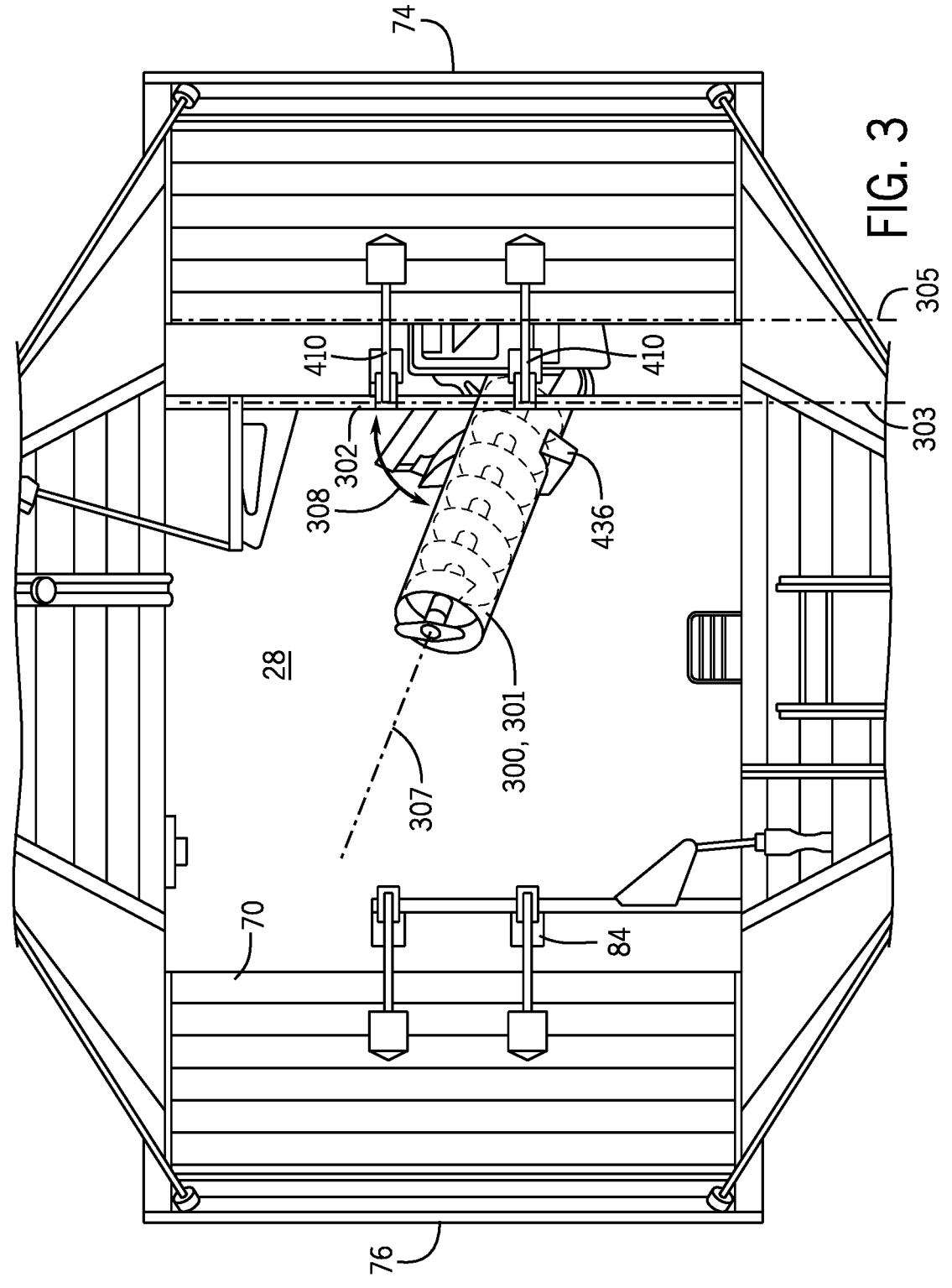
FIG. 3 is a top plan view of the grain tank of FIG. 2, wherein the tank cover sections are shown in an open position and the bubble up auger is shown in a raised position.
Figures 4, 4A:
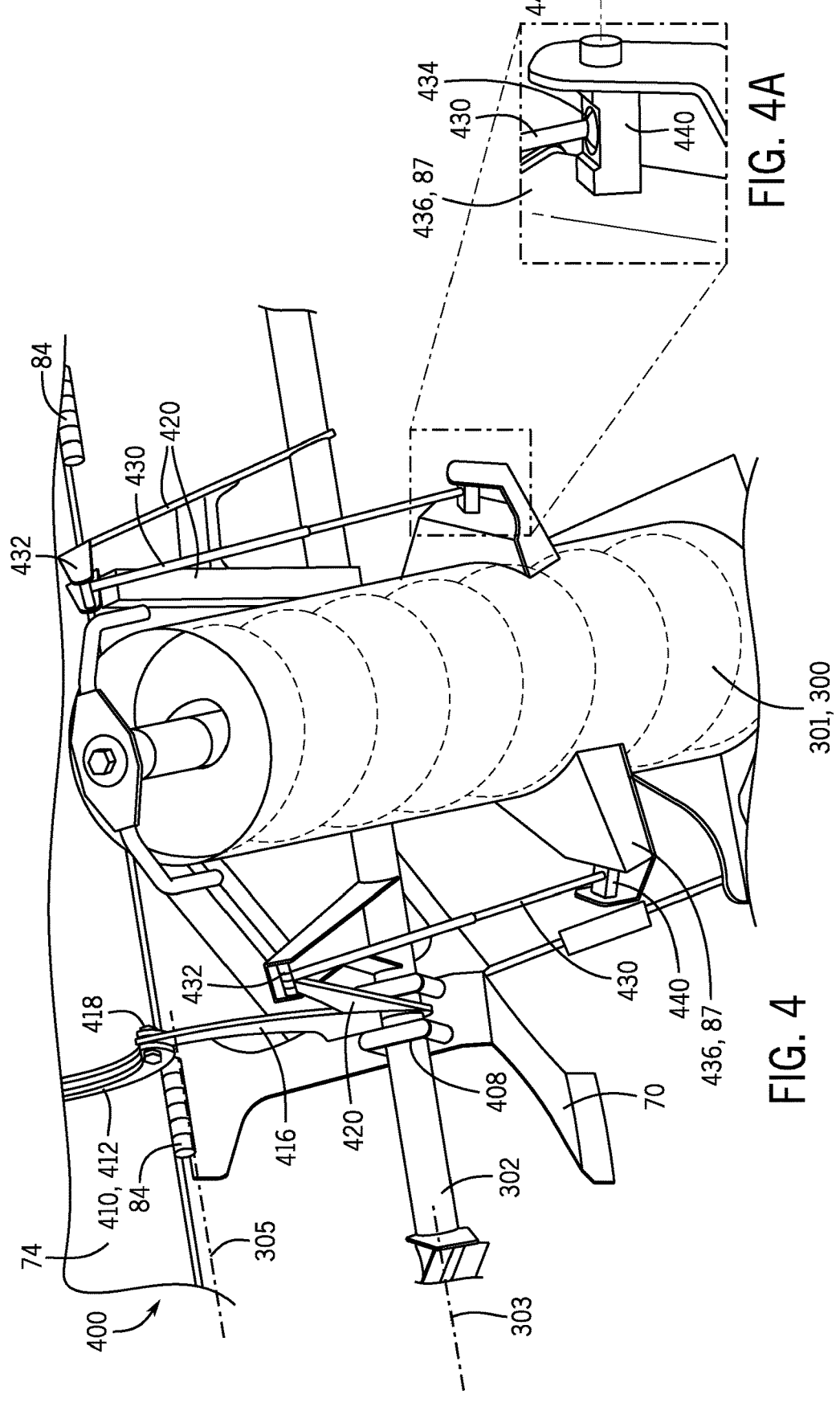
FIG. 4 is a detailed isometric view of the raised bubble up auger of FIG. 3 and a lift system for the bubble up auger.
FIG. 4A is a magnified view of FIG. 4.
Figure 5:
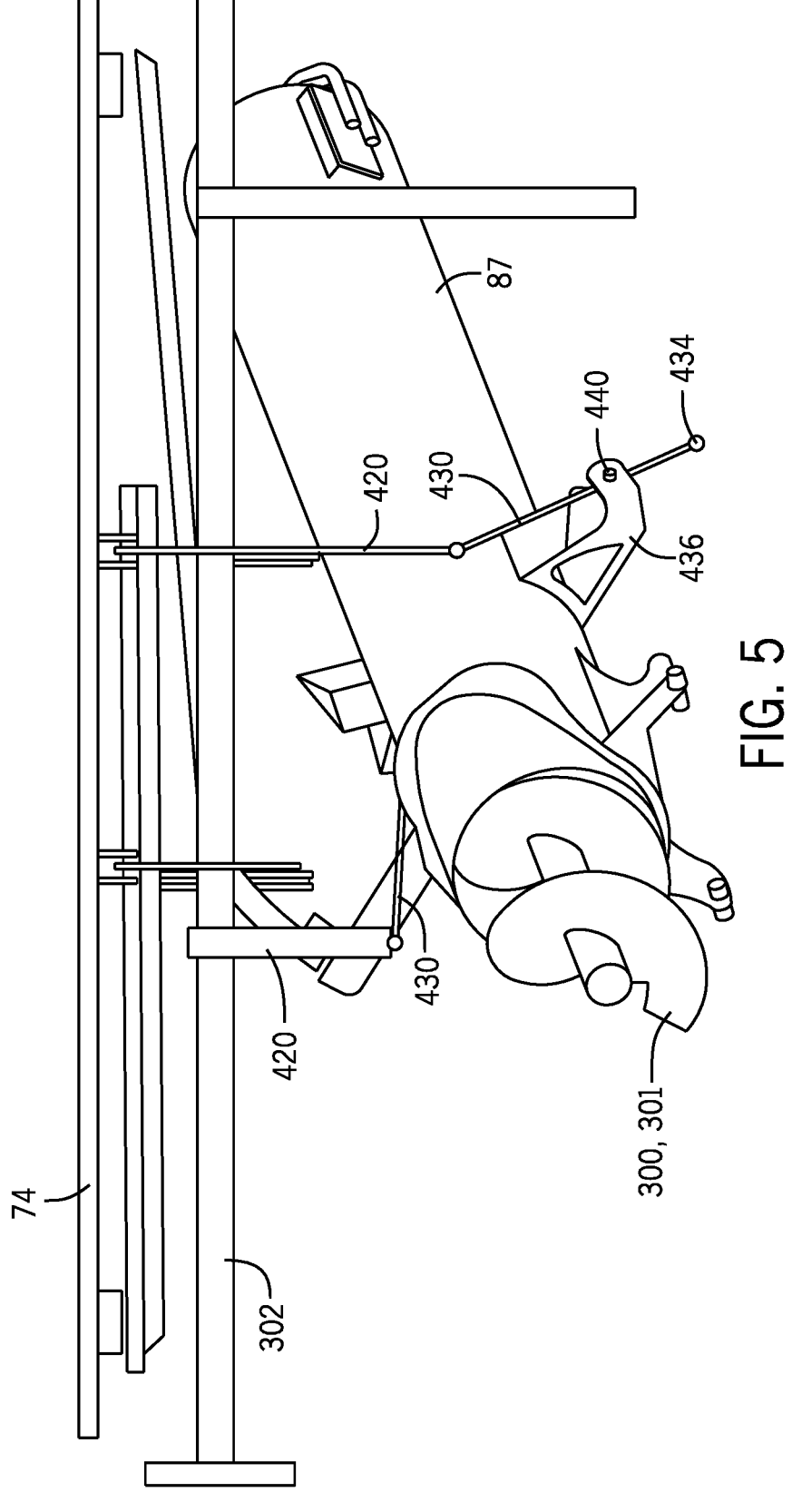
FIGS. 5 and 6 are detailed isometric views of the bubble up auger of FIG. 4, wherein the bubble up auger is shown in a lowered position.
Figure 6:
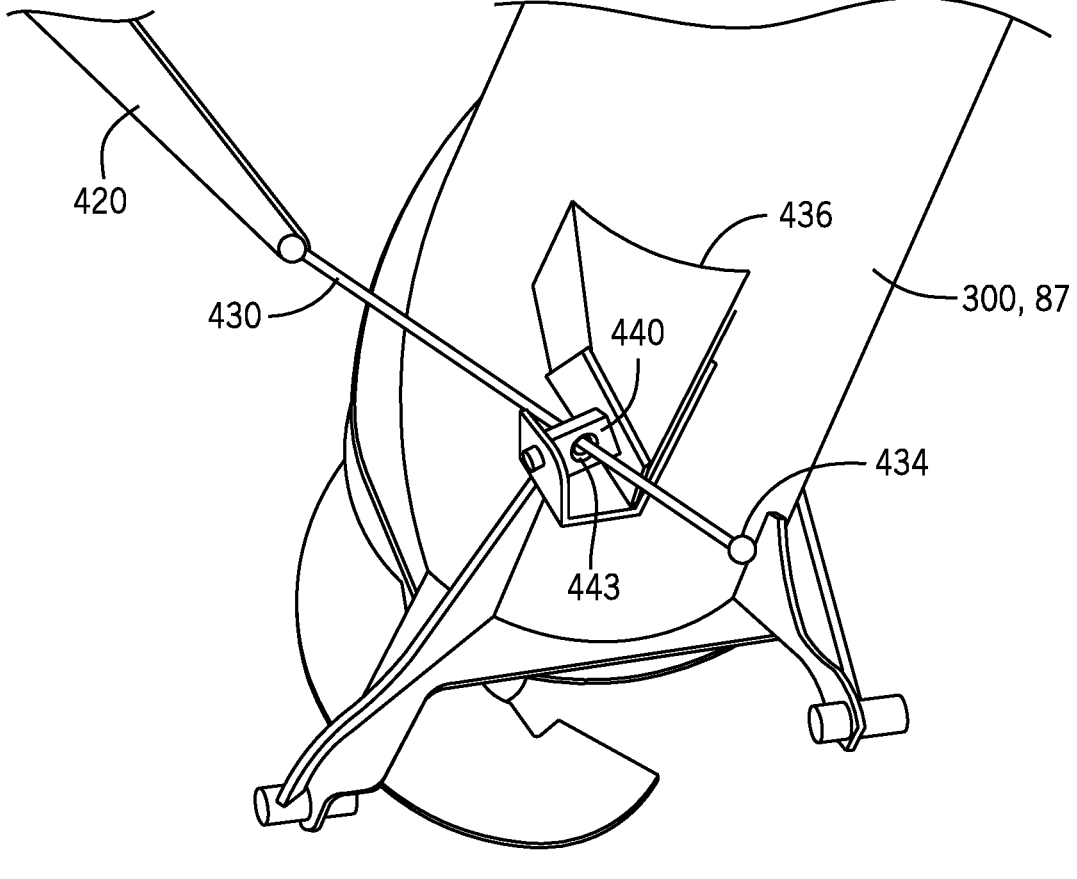

Turning now to FIGS. 2-4, bubble up auger 300 moves the grain towards the center of the grain tank 28. At the end of the bubble up auger 300 the grain is discharged into the center of the tank 28. Bubble up auger 300 is an assembly that generally includes an auger 301 that is surrounded by a tube 87. Tube is shown in FIGS. 2, 5 and 6, but omitted in FIGS. 3 and 4. Bubble up auger 300 is hinged near its base so that the auger can rotate or pivot from a raised position (see FIGS. 2-4) to a transport, or substantially horizontal position (see FIGS. 5-6). A lift system 400, which is described hereinafter, is employed to facilitate movement of bubble up auger 300 between the raised position and the transport position.

Lift system 400 may generally comprise hinges 84, scissor linkages 410, brackets 420, slider rods 430 and swivel pins 440. Lift system 400 may further comprise actuator 78, force assistor 80 and tank cover section 74. Lift system 400 (or portion thereof) combined together with auger 300 may be referred to herein as a bubble up auger assembly.

Turning now to the individual components of lift system 400, the tank cover sections 74 and 76 are hinged to the frame 70 by respective hinges 84. As best shown in FIG. 4, each of the hinges 84 associated with tank cover section 74 has one part (e.g., a knuckle) that is fixed to tank cover section 74 and another part (e.g., a mating knuckle) that is connected to frame 70 such that tank cover section 74 can pivot about axis 305. A two-link scissor linkage 410 is connected to tank cover section 74 and a rockershaft 302. Rockershaft 302 is a pivotable shaft that may be rotatably mounted to the frame 70 of grain tank 28 by bearings 408. Rockershaft 302 rotates about axis 303. Axis 303 may be aligned with the fore-aft direction (fore direction being the forward direction of travel of combine 10) or the transverse direction of the combine.

A first link 412 of linkage 410 is fixed to tank cover section 74, and the second link 416 of linkage 410 has a first end that is pinned to the first link 412 by a pin 418 and a second end that is fixed to rockershaft 302. Second link 416 may be non-rotatably connected to rockershaft 302 such that rotation of second link 416 causes rotation of rockershaft 302. Links 412 and 416 can pivot relative to each other about pin 418. The axis of rotation of pin 418 may be parallel to the axis 305.

At least two brackets 420 are also non-rotatably connected to rockershaft 302 such that brackets 420 rotate along with rockershaft 302. One end of each bracket 420 is non-rotatably connected to rockershaft 302 and an opposite end of each bracket 420 is connected to a respective slider rod 430.

Although only one of the slider rods 430 is described hereinafter, it should be understood that the other slider rod is substantially similar or identical. Slider rod 430 includes (i) a first end that is pivotably connected to one of the two brackets 420 by a respective pin 432, and (ii) a second end 434 that is releasably connected to a mount 436 that is fixed to outer tube 87 of bubble up auger 300. Pin 432 of slider rod 430 may be oriented substantially parallel to pin 440. It is noted that mounts 436 are fixed on opposing sides of outer tube 87. A swiveling pin 440 is pivotably coupled to mount 436 about axis 441. The second end 434 of slider rod 430 is positioned through a transverse opening 443 (FIG. 6) formed in pin 440. Second end 434 of slider rod 430 comprises a ball. The ball of second end 434 is capable of mating with a chamfered surface (chamfer optional) on the backside of pin 440 (as viewed in FIG. 4A) to form a ball joint. It should be understood that second end 434 cannot pass through the opening 443 in pin 440.

Slider rod 430 may be capable of telescoping, and, thus, have a variable length. Alternatively, slider rod 430 may have a fixed length.

As noted in the background section, bubble up auger 300 is angled relative to the rockershaft 302 to accommodate the greater length of bubble up auger 300. As shown in FIG. 3, the longitudinal and rotational axis 307 of bubble up auger 300 is angled and oblique (i.e., not parallel or perpendicular) with respect to the axis 303 of rockershaft 302, as viewed in a Cartesian Coordinate system. See oblique angle 308. Lift system 400 is particularly suited to facilitate the angular movement of bubble up auger 300 (i.e., angular with respect to rockershaft 302) between the raised and lowered positions. In particular, pins 432 and 440 are also oriented obliquely with respect to axis 303 to facilitate the angular movement.

In FIGS. 4 and 4A, bubble up auger 300 is shown in the raised position. In the raised position, the ball joint end 434 is nested within an opening 443 (FIG. 6) disposed in the chamfered surface on the backside of pin 440. The slider rods 430 are at maximum extension, and hold (e.g., lock) the bubble up auger 300 in the raised position. Bubble up auger 300 is prevented from rotating downward toward the lowered position due to the engagement at the ball joints.

Turning now to FIGS. 5 and 6, bubble up auger 300 is shown in the lowered position. To move bubble up auger 300 from the raised position to the lowered position, actuator 78 and/or force assistor 80 are activated to rotate tank cover section 74 about hinges 84 toward the closed position. As tank cover section 74 moves toward the closed position, scissor linkage 410 articulates about pin 418 such that the second link 416 rotates rockershaft 302 in a first rotational direction, which causes brackets 420 to rotate in the first rotational direction, which causes slider rods 430 to rotate in the first rotational direction, which causes bubble up auger 300 to rotate in the first rotational direction, eventually resulting in bubble up auger 300 moving to the lowered position at which time tank cover section 74 can lay horizontal on the top surface of grain tank 28 and over auger 300. In the closed position, tank cover section 74 (along with the other tank cover sections) is maintained in a horizontal position to conceal opening 72 of grain tank 28 to isolate the clean grain within tank 28 from the external environment.

Auger 300 is oriented along axis 307, which is oblique to axes 303 and 305. See oblique angle 308 in FIG. 3. Auger 300 may be oriented at oblique angle 308 in both the raised and lowered positions. Due to the orientation of pins 432 and 440 and other factors, auger 300 rotates downward (with respect to it base) such that the oblique orientation of auger 300 is maintained in at least the lowered position. By assuming an oblique orientation in the lowered position, auger 300 can fit within the interior space of tank 28. It should be understood that in the lowered position of auger 300, auger 300 is contained entirely within the interior of tank 28. It should also be understood that the auger 300 could potentially assume an orientation in the raised position other than the oblique position.

Referring still to the process of moving the auger 300 from the raised position to the lowered position, at a certain point, the auger 300 will reach its lowered position and rest against a stationary surface. However, tank cover section 74 will continue rotating to its respective closed position. While tank cover section 74 continues rotating to its closed position, ball joint end 434 separates from pin 440 while the slider rod 430 continues to move through the opening 443 (FIG. 6) of pin 440, the significance of which will be described hereinafter.

To open the cover sections 74, 76 and return the auger 300 to the raised position, actuator 78 and/or force assistor 80 are activated to rotate tank cover section 74 about hinges 84 toward the open position. As tank cover section 74 rotates about its hinges 84 toward the open position, scissor linkage 410 articulates about pin 418 such that the second link 416 rotates rockershaft 302 in a second rotational direction (opposite the first rotational direction), which causes brackets 420 to rotate in the second rotational direction, which causes slider rods 430 to rotate in the second rotational direction. Because ball joint end 434 is detached and spaced apart from pin 440, as shown in FIG. 6, tank cover section 74 moves toward the open position for a predetermined time while auger 300 remains stationary in the lowered position. Once ball joint end 434 of slider rod 430 engages with the opening 443 of pin 440, slider rod 430 pulls auger 300 toward the raised position until the auger 300 eventually reaches the raised position shown in FIG. 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bubble-up auger assembly for associated with an agricultural vehicle, the bubble-up auger assembly comprising:

an outer tube having a mount attached thereto;

an auger at least partially surrounded by the outer tube, the auger having an axis of rotation;

a bracket being non-rotatably connectable to a rockershaft of the agricultural vehicle for rotation about a first axis; and a slide rod connected to the bracket and slidably connected to the mount of the outer tube, wherein one end of the slide rod forms a ball, the slide rod causing the auger to move between a raised position and a lowered position in response to rotation of the bracket; and a pin, which has an opening passing therethrough, being connected to the mount;

wherein, in the raised position of the auger, the ball is seated against the opening of the pin, wherein, in the lowered position of the auger, the slide rod is positioned through the opening of the pin and the ball is spaced apart from the opening of the pin, and wherein, in the lowered position of the auger, the axis of rotation of the auger is oriented oblique to the first axis.

2. The bubble-up auger assembly of claim 1, wherein the first axis is an axis of rotation of the rockershaft.

3. The bubble-up auger assembly of claim 1, wherein the slide rod is also connected to the bracket by a second pin.

4. A grain tank assembly for the agricultural vehicle comprising a grain tank and the bubble-up auger assembly of claim 1.

5. The grain tank assembly of claim 4, further comprising the rockershaft being rotatably connected with respect to the grain tank about the first axis.

6. The grain tank assembly of claim 5, further comprising a grain tank cover being movably mounted to the grain tank between an open position and a closed position, and a linkage connected to both the grain tank cover and the rockershaft such that rotation of the grain tank cover causes movement of the linkage which causes rotation of the rockershaft.

7. The grain tank assembly of claim 6, wherein in the closed position of the grain tank cover, the auger is positioned in the lowered position, and in the open position of the grain tank cover, the auger is positioned in the raised position.

8. The grain tank assembly of claim 6, wherein the grain tank cover is coupled to the grain tank by a hinge that is separate from the linkage.

9. An agricultural harvester comprising the grain tank assembly of claim 4.

10. A bubble-up auger assembly associated with an agricultural vehicle, the bubble-up auger assembly comprising:

an auger at least partially surrounded by an outer tube, the auger having an axis of rotation;

a bracket being non-rotatably connectable to a rockershaft of the agricultural vehicle for rotation about a first axis; and a slide rod connected to the outer tube and the bracket, the slide rod causing the auger to move between a raised position and a lowered position in response to rotation of the bracket;

wherein the slide rod is connected to the outer tube by a first pin, the slide rod is connected to the bracket by a second pin, wherein the first and second pins are oriented oblique to the first axis, and wherein, in the lowered position of the auger, the axis of rotation of the auger is oriented oblique to the first axis.

11. A grain tank assembly for the agricultural vehicle comprising a grain tank and the bubble-up auger assembly of claim 10.

12. The grain tank assembly of claim 11, further comprising the rockershaft being rotatably connected with respect to the grain tank about the first axis.

13. The grain tank assembly of claim 12, further comprising a grain tank cover being movably mounted to the grain tank between an open position and a closed position, and a linkage connected to both the grain tank cover and the rockershaft such that rotation of the grain tank cover causes movement of the linkage which causes rotation of the rockershaft.

14. The grain tank assembly of claim 13, wherein in the closed position of the grain tank cover, the auger is positioned in the lowered position, and in the open position of the grain tank cover, the auger is positioned in the raised position.

15. The grain tank assembly of claim 13, wherein the grain tank cover is coupled to the grain tank by a hinge separate from the linkage.

16. An agricultural harvester comprising the grain tank assembly of claim 11.

* * * * *